United States Patent
Park et al.

(10) Patent No.: US 9,266,505 B2
(45) Date of Patent: Feb. 23, 2016

(54) FLAT-BLADE TYPE WIPER APPARATUS HAVING IMPROVED END CAP STRUCTURE

(71) Applicant: Dongyang Mechatronics Corp., Incheon (KR)

(72) Inventors: Wi Yeong Park, Incheon (KR); Sung Jun Yoon, Incheon (KR)

(73) Assignee: Dongyang Mechatronics Corp., Incheon (KR)

( * ) Notice: Subject to any disclaimer, the term of this patent is extended or adjusted under 35 U.S.C. 154(b) by 257 days.

(21) Appl. No.: 14/027,933

(22) Filed: Sep. 16, 2013

(65) Prior Publication Data

US 2014/0115810 A1    May 1, 2014

(30) Foreign Application Priority Data

Oct. 25, 2012  (KR) .................. 10-2012-0119299

(51) Int. Cl.
*B60S 1/38*    (2006.01)
(52) U.S. Cl.
CPC ............. *B60S 1/3889* (2013.01); *B60S 1/3874* (2013.01); *B60S 1/3881* (2013.01)
(58) Field of Classification Search
CPC ........ B60S 1/3874; B60S 1/3881; B60S 1/38; B60S 1/3886; B60S 1/3887; B60S 1/3889; B60S 1/3891; B60S 1/3893; B60S 1/3894; B60S 1/3896; B60S 2001/3841
See application file for complete search history.

(56) References Cited

U.S. PATENT DOCUMENTS

| | | | |
|---|---|---|---|
| 6,668,419 B1 | 12/2003 | Kotlarski | |
| 7,540,061 B1 * | 6/2009 | Huang | 15/250.201 |
| 8,196,252 B2 * | 6/2012 | Henin | 15/250.201 |
| 8,424,149 B2 | 4/2013 | Coemans et al. | |
| 2011/0113581 A1 * | 5/2011 | Boland | 15/250.31 |
| 2011/0225761 A1 | 9/2011 | Kim | |

FOREIGN PATENT DOCUMENTS

| | | |
|---|---|---|
| CN | 1327422 A | 12/2001 |
| CN | 102164787 A | 8/2011 |
| CN | 102224042 A | 10/2011 |
| DE | 20 2004 012 109 U | 11/2004 |

(Continued)

OTHER PUBLICATIONS

Search Report issued by German Patent Office for corresponding German application No. 10 2013 221 440.5 mailed Jan. 31, 2013 with English translation.

(Continued)

*Primary Examiner* — Gary Graham
(74) *Attorney, Agent, or Firm* — Frommer Lawrence & Haug LLP

(57) ABSTRACT

A flat-blade type wiper apparatus includes: a wiper lip; a spoiler-integrated lever that prevents the wiper lip from floating on the windshield of a vehicle; a vertebra that elastically supports the wiper lip; and an end cap that prevents the wiper lip from slipping in a direction of a length of the vertebra, wherein a cap fixing hole is disposed at one end of the vertebra and passes through an upper surface and a lower surface of the vertebra; a first stopper protrudes from a ceiling surface of the end cap in a downward direction and couples to the cap fixing hole; and a second stopper protrudes from a sidewall of the end cap toward the wiper lip, and prevents the wiper lip from slipping by being accommodated in a coupling groove that is formed in the wiper lip.

6 Claims, 6 Drawing Sheets

(56) References Cited

FOREIGN PATENT DOCUMENTS

| | | |
|---|---|---|
| DE | 10 2006 059 077 A | 6/2008 |
| DE | 10 2008 010 564 A | 6/2009 |
| DE | 10 2008 001 152 A | 10/2009 |
| DE | 202011003000 U | 6/2011 |
| EP | 1 514 752 A | 3/2005 |
| EP | 1 683 695 A | 7/2006 |
| EP | 1 179 987 A | 4/2007 |
| EP | 2 159 115 A | 3/2010 |
| JP | 2007-313908 A | 12/2007 |
| JP | 2009-280201 A | 12/2009 |
| KR | 10-2011-0031788 A | 3/2011 |
| KR | 10-2011-0074552 A | 6/2011 |
| KR | 10-1166494 B | 7/2012 |
| WO | WO2008/071510 A1 * | 6/2008 |
| WO | WO 2010/034439 A | 4/2010 |
| WO | WO 2012/139643 A | 10/2012 |

OTHER PUBLICATIONS

Office action issued by German Patent Office for corresponding German application No. 10 2013 221 440.5 mailed Apr. 1, 2014 with English translation.

Notice of Allowance issued by Korean Patent Office for priority application KR 10-2012-0119299 dated Nov. 20, 2012 including English translation.

Office action issued by Chinese Patent Office for corresponding Chinese application 201310495349.2 mailed Jul. 3, 2015.

\* cited by examiner

FLAT-BLADE TYPE WIPER APPARATUS HAVING IMPROVED END CAP STRUCTURE

RELATED APPLICATIONS

This application claims the benefit of Korean Patent Application No, 10-2012-0119299, filed on Oct. 25, 2012, in the Korean Intellectual Property Office, the disclosure of which is incorporated herein in its entirety by reference.

BACKGROUND

1. Field

One or more embodiments of the present invention relate to a wiper blade apparatus for a vehicle, and more particularly, to a flat-blade type wiper apparatus.

2. Description of the Related Art

A blade assembly for cleaning a windshield of a vehicle is an active safety device, as well as device that provides user convenience, which is installed to ensure a driver's view by removing foreign substances or rain drops on a glass surface of the windshield.

Generally, the blade assembly for cleaning the windshield slides on and contacts the vehicle. The blade assembly for cleaning the windshield includes a wiper strip that slides on and contacts the windshield and has rubber elasticity, a vertebra that elastically supports the wiper strip, and a retainer and a coupling apparatus as a coupling assembly for firmly fixing the wiper strip to a wiper arm. Generally, the retainer has a tournament structure, so as to accommodate a deviation in contact between a wiper strip and the windshield, according to a difference in curvature of the windshield between the wiper strip and the retainer. The tournament structure may include a space between the wiper strip and the retainer. Recently, as roads have been improved for high-speed driving, and the performance of a vehicle has been enhanced, a problem of a conventional blade assembly to clean the windshield has been raised. That is, when a wiper apparatus operates while a vehicle is moving at a high speed of 160 km or more, a lift may be exerted on the blade assembly for cleaning the windshield, and the blade assembly for cleaning the windshield may not properly contact the windshield. Thus, the wiper apparatus may not properly wipe the windshield. In order to solve such a problem, there is a need to develop a new blade assembly for cleaning the windshield that does not include a retainer structure.

Recently, a wiper apparatus, referred to as a "flat-blade type wiper apparatus", has drawn attention for preventing floating of a wiper while a vehicle is moving at a high speed. In the case of the flat-blade type wiper apparatus, a vertebra that supports a wiper lip is formed of a spoiler-integrated lever, and a connector apparatus for connecting a wiper arm to the wiper apparatus is disposed at a center of the vertebra. Korean Patent Publication No. 2011-0074552 discloses an example of the flat-blade type wiper apparatus.

A flat-blade type wiper apparatus generally includes a wiper apparatus and a vertebra, which are coupled to the spoiler-integrated lever. Then, a cover, referred to as an end cap, is installed at both ends of the wiper lip, so that the wiper lip does not slide and detach from the spoiler-integrated lever. The end cap also functions to improve an appearance of the flat-blade type wiper apparatus. However, since a conventional end cap is not directly clipped or fixed to the wiper lip, it may be difficult to replace the wiper lip, or the wiper lip may slip in a direction of a length of the wiper lip, and thus, the wiping performance of the wiper apparatus may deteriorate.

The present invention solves such a problem. The present invention provides a flat-blade type wiper apparatus having an improved end cap structure, so that the wiper lip is effectively supported and firmly coupled to a vertebra. Thus, while the wiper apparatus is operating, the wiper lip may not slip and may be easily replaced.

SUMMARY

Additional aspects will be set forth in part in the description which follows and, in part, will be apparent from the description, or may be learned by practice of the presented embodiments.

According to one or more embodiments of the present invention, a flat-blade type wiper apparatus having an improved end cap structure includes a wiper lip that is manufactured of an elastic material, so as to remove a foreign substance on a surface of the windshield of a vehicle by contacting and sliding on the windshield; a spoiler-integrated lever that accommodates an upper part of the wiper lip and prevents the wiper lip from floating on the glass while the vehicle is moving at a high speed; a vertebra that is assembled in the spoiler-integrated lever and elastically supports the wiper lip to the glass; and an end cap that couples to one end of the vertebra and prevents the wiper lip from slipping in a direction of a length of the vertebra, wherein a cap fixing hole is disposed at one end of the vertebra in a direction of a length of the vertebra and passes through an upper surface and a lower surface of the vertebra, a first stopper protrudes from a ceiling surface of the end cap to a downward direction and couples to the cap fixing hole and a second stopper protrudes from a sidewall of the end cap toward the wiper lip, and prevents the wiper lip from slipping by being accommodated in a coupling groove that is formed in the wiper lip.

The first stopper may be formed so that a cross-section thereof is formed in the form of a sawtooth and a slope at an end in a direction of a length of the vertebra is steeper than a slope at a center of the vertebra.

The second stopper may be formed so that a cross-section thereof is formed in the form of a sawtooth and a slope at an end in a direction of a length of the wiper lip is steeper than a slope at a center of the wiper lip.

Two end caps are provided, wherein one end cap is arranged on one end of the vertebra and the other end cap is arranged on the other end of the vertebra, and the end cap, disposed at the other end of the vertebra, may not include the second stopper.

The end cap, disposed at the other end of the vertebra, includes a work cover that may be opened and closed so that the wiper lip may be disassembled or assembled while the end cap, disposed at the other end of the vertebra, is not detached from the vertebra.

The work cover may be rotatably coupled to the end cap, disposed at the other end of the vertebra.

The flat-blade type wiper apparatus may include an auxiliary stopper that is disposed in a periphery of the first stopper in a direction of a length of the vertebra from the first stopper to a center of the vertebra, and that is smaller than the first stopper.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
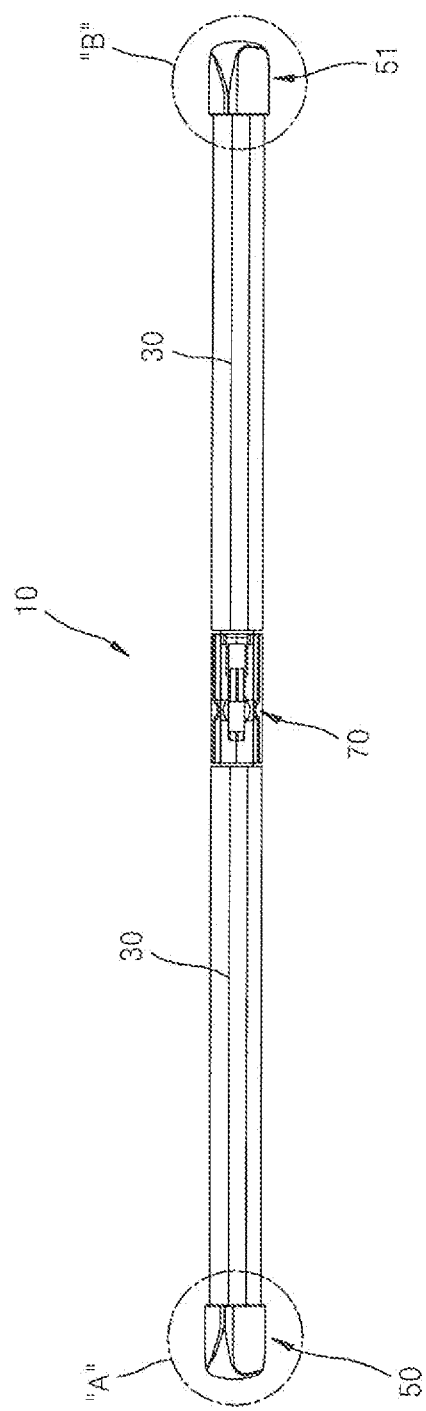
FIG. 1 is a plan view of a flat-blade type wiper apparatus to which end c are applied, according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Expressions such as "at least one of," when preceding a list of elements, modify the entire list of elements and do not modify the individual elements of the list.

Hereinafter, the present invention will be described more fully with reference to the accompanying drawings, in which exemplary embodiments of the invention are shown.

Figure 2:
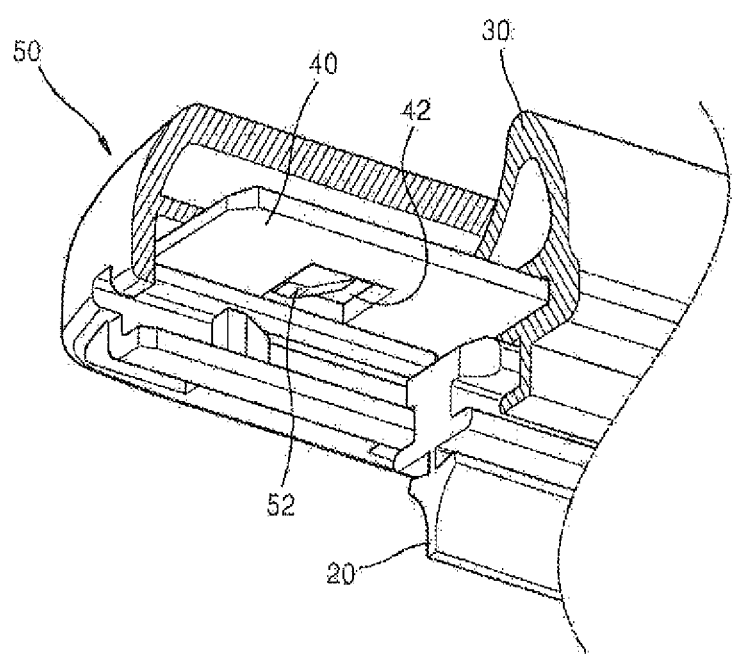
FIG. 2 is a cutaway perspective view of area "A" shown in FIG. 1.
Figure 3:
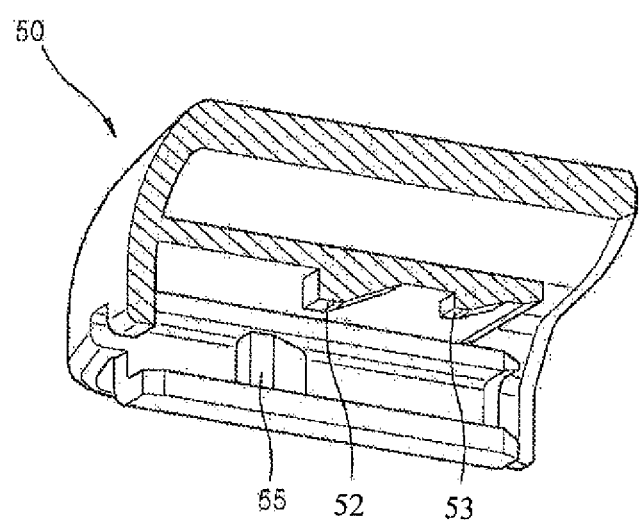
FIG. 3 is a cutaway perspective view of the end cap in the area "A" shown in FIG. 1.
Figure 4:
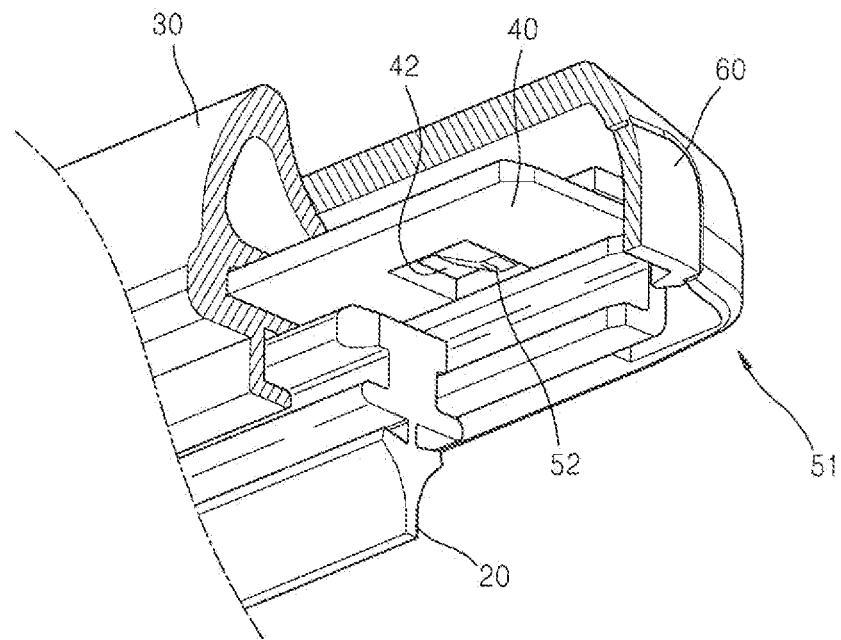
FIG. 4 is a cutaway perspective view of an area "B" shown in FIG. 1.
Figure 5:
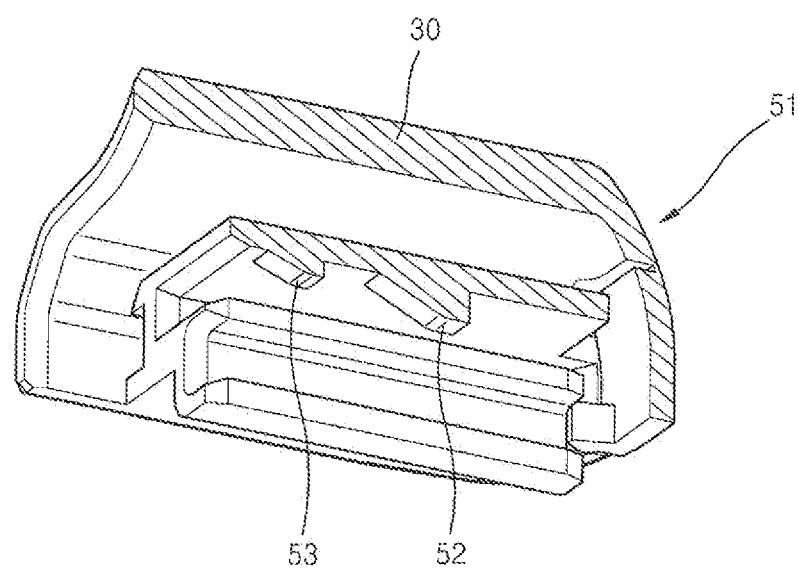
FIG. 5 is a cutaway perspective view of are end cap in the area "B" shown in FIG. 1.
Figure 6:
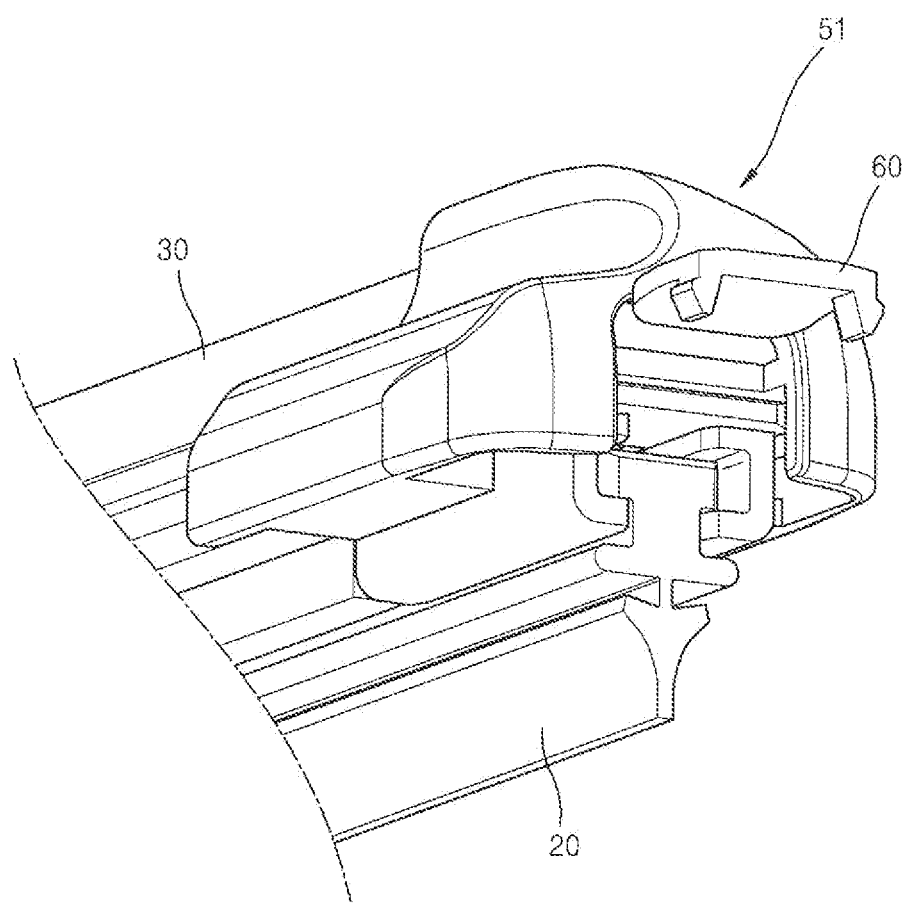
FIG. 6 is a diagram illustrating a state in which a work cover, which is installed on the end cap in the area "B" shown in FIG. 1, is opened.
Figure 7:
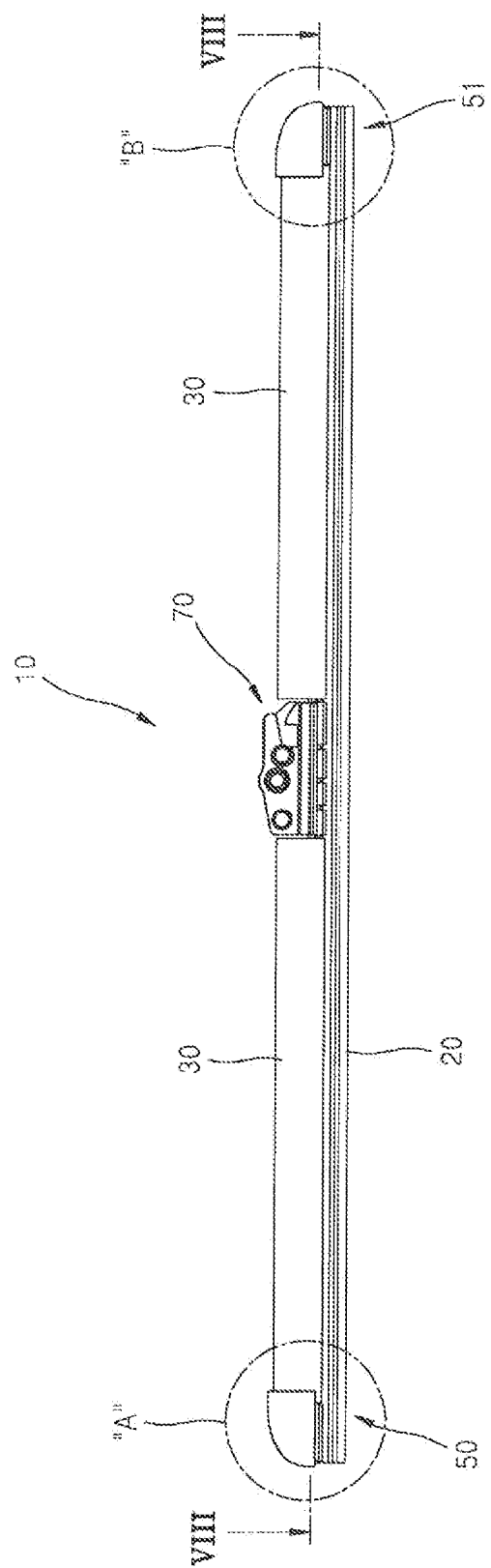
FIG. 7 is a front view of the flat-blade type wiper apparatus shown in FIG. 1.
Figure 8:
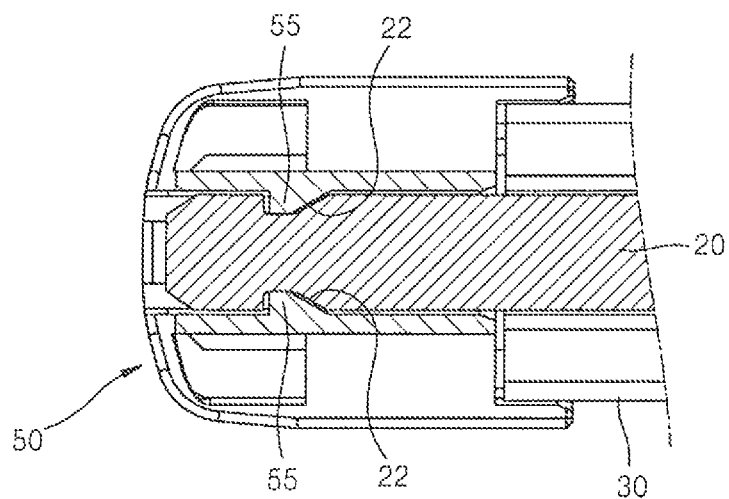
FIG. 8 is a cross-sectional view of the area "A", shown in FIG. 7, which is taken along line VIII-VIII.
Figure 9:
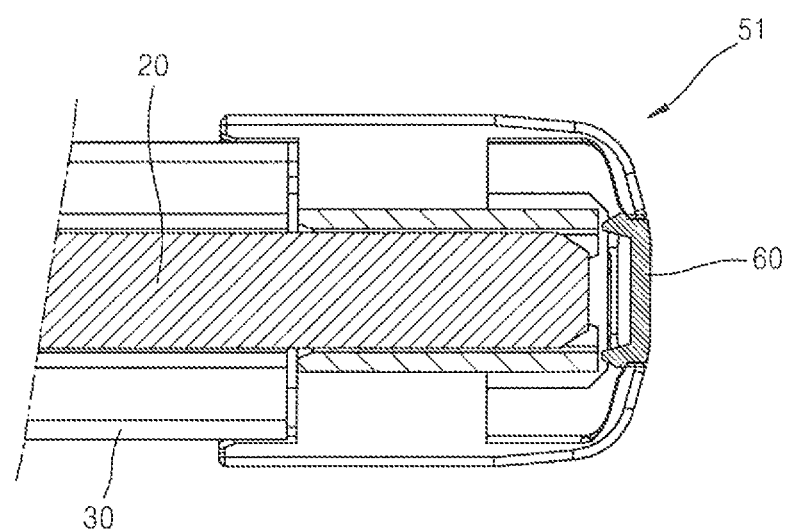
FIG. 9 is a cross-sectional view of the area "B", shown in FIG. 7, which is taken along line VIII-VIII.

FIG. 1 is a plan view of a flat-blade type wiper apparatus 10 (hereinafter, referred to as "wiper apparatus") to which end caps 50 and 51 are applied, according to an embodiment of the present invention. FIG. 2 is a cutaway perspective view of area "A" shown in FIG. 1. FIG. 3 is a cutaway perspective view of the end cap 50 in the area "A" shown in FIG. 1. FIG. 4 is a cutaway perspective view of area "B" shown in FIG. 1. FIG. 5 is a cutaway perspective view of the end cap 51 in the area "B" shown in FIG. 1. FIG. 6 is a diagram illustrating a state in which a work cover 60, which is installed in the end cap 51 in the area "B" shown in FIG. 1, is opened. FIG. 7 is a front view of the wiper apparatus 10 shown in FIG. 1. FIG. 8 is a cross-sectional view of the area "A", shown in FIG. 7, which is taken along line VIII-VIII. FIG. 9 is a cross-sectional view of the area "B", shown in FIG. 7, which is taken along line VIII-VIII.

Referring to FIGS. 1 through 9, according to an embodiment of the present invention, the flat-blade type wiper apparatus 10 that has an improved end cap structure, hereinafter referred to as a wiper apparatus, is an apparatus that is installed on the windshield of a vehicle. The wiper apparatus 10 includes a wiper lip 20, a spoiler-integrated lever 30, a vertebra 40, and the end caps 50 and 51.

The wiper lip 20 is a member that contacts and slides on a glass surface of the windshield. The wiper lip 20 may be formed of elastic rubber. The wiper lip 20 functions to remove foreign substances on the glass surface of the windshield.

The spoiler-integrated lever 30 is a member that supports and accommodates the wiper lip 20. The spoiler-integrated lever 30 performs functions of a yoke member, a lever member, and a spoiler, which are included in a well-known conventional tournament-type wiper apparatus. The spoiler-integrated lever 30 is a member that extends long in a length direction of the wiper lip 20. A shape of a spoiler is formed on an upper part of the spoiler-integrated lever 30. A space that accommodates an upper part of the wiper lip 20 is included on a lower part of the spoiler-integrated lever 30. The spoiler-integrated lever 30 functions to prevent the wiper lip 20 from floating from the glass surface of the windshield when the vehicle is moving at a high speed. Two spoiler-integrated levers 30 may be provided symmetrically at both sides of a connector apparatus 70, which is disposed in a central area of the vertebra 40 that is described later.

The vertebra 40 is assembled with the spoiler-integrated lever 30. The vertebra 40 is a member that is formed by a linear extension of a member in a shape of a flat-plate. The vertebra 40 may be formed of a material, such as carbon steel. Since such a material has a high elastic modulus, the vertebra 40 has a fine elastic recovering force. The vertebra 40 elastically supports the wiper lip 20 on the windshield. The vertebra 40 is formed longer than the spoiler-integrated lever 30. The vertebra 40 includes a cap fixing hole 42. The cap fixing hole 42 is disposed at an end of the vertebra 40 in a direction of a length of the vertebra 40. In the current embodiment, one cap fixing hole 42 is respectively provided at both ends of the vertebra 40. The cap fixing hole 42 is formed to pass through an upper surface and a lower surface of the vertebra 40. The cap fixing hole may be formed, for example, in a square shape.

The end cap 50 couples to an end of the vertebra 40. The end cap 50 functions to prevent the wiper lip 20 from slipping in a direction of a length of the vertebra 40. A structure of the end cap 50 performs a key function in the present invention, as described in detail hereinafter.

The end cap 50 includes a first stopper 52, a second stopper 55, and an auxiliary stopper 53.

The first stopper 52 is formed to protrude from a ceiling surface of the end cap 50 in a downward direction. The first stopper 52 is a projection that couples to the cap fixing hole 42. The first stopper 52 fixes the vertebra 40 and the end cap 50 to each other, and thus, prevents the end cap 50 from being detached from the vertebra 40. The first stopper 52 is formed to have a cross-section in the form of a sawtooth. The cross-sectional structure of the first stopper 52 is formed such that a slope at an end in a direction of a length of the vertebra 40 is steeper than a slope at a center of the vertebra 40. Accordingly, the first stopper 52 strongly prevents the end cap 50 from detaching from the end of the vertebra 40, and relatively weakly prevents the end cap 50 from accessing a center of the vertebra 40. The auxiliary stopper 53 is disposed in a periphery of the first stopper 52. If the first stopper 52 is damaged or dislocated from the cap fixing hole 42, the auxiliary stopper 53 secondarily prevents the end cap 50 from being detached from the vertebra 40. Like the first stopper 52, a cross-sectional structure of the auxiliary stopper 53 is formed in the form of a sawtooth. When the first stopper 52 is accommodated in the cap fixing hole 42, the second stopper 55 is disposed to contact an upper surface of the vertebra 40. Accordingly, the auxiliary stopper 53 is formed smaller than the first stopper 52. A cross-sectional structure of the auxiliary stopper 53 is substantially identical to that of the first stopper 52. The auxiliary stopper 53 is disposed in a periphery of the first stopper 52 in a direction of a length of the vertebra 40 from the first stopper 52 to a center of the vertebra 40.

The second stopper 55 is a structure in the form of a projection that protrudes toward the wiper lip 20 from a sidewall of the end cap 50. The second stopper 55 is accommodated in a coupling notch 22 that is formed in the wiper lip 20, thus preventing the wiper lip 20 from slipping. As shown in FIG. 8, the second stopper 55 may be formed at both sides of an inner wail of the end cap 50, with the wiper lip 20 therebetween. The second stopper 55 is formed to have a cross-section in the form of a sawtooth. The cross-sectional structure of the second stopper 55 is formed such that a slope at an end in a direction of a length of the wiper lip 20 is steeper than a slope at a center of the wiper lip 20. That is, the cross-sectional structure of the second stopper 55 is similar to that of the first stopper 52.

The end caps 50 and 51 are provided respectively to opposite ends of the vertebra 40; ie., an end and the other end of the vertebra 40. As shown in FIG. 9, it may be desirable that the end cap 51, disposed at the other of the vertebra 40, does not include the second stopper 55. The end cap 51, disposed at the other end of the vertebra 40, includes a work cover 60. The work cover 60 may be opened and closed, so that the wiper lip 20 may be disassembled or assembled while not detaching the end cap 51 from the vertebra 40. The work cover 60 is rotatably coupled to the end cap 51. Referring to FIG. 8, it may be easily understood that the work cover 60 has a structure that is rotatably coupled to the end cap 51. If the second stopper 55 is not included in the end cap 51 at the other end of the vertebra 40, this may help to replace the wiper lip 20. That is, if the wiper lip 20 is pulled toward the end of the vertebra 40, there are no obstacles when detaching the wiper lip 20 from the wiper apparatus 10.

Hereinafter, a working effect of the wiper apparatus 10, which includes such a configuration as described above, will be described in detail.

First, a process of assembling the wiper apparatus 10 is described as example.

A sequence of assembling elements, which constitute the wiper apparatus 10, is generally as follows, though not limited thereto:

First, the vertebra 40 is coupled to the spoiler-integrated lever 30. The vertebra 40 may be coupled to the spoiler-integrated lever 30, by inserting the vertebra 40 into a hole or a groove that is formed on the spoiler-integrated lever 30. The wiper lip 20 is coupled to the spoiler-integrated lever 30, in this process, the wiper lip 20 is coupled to the spoiler-integrated lever 30 by pushing and inserting the wiper lip 20 into the spoiler-integrated lever 30 from the other end of the vertebra 40 toward the end of the vertebra 40. Then, the end cap 50 is coupled to the end of the vertebra 40. The end cap 50 is slid into and coupled to the end of the vertebra 40. In this process, the first stopper 52, provided in the end cap 50, is accommodated in the cap fixing hole 42 that is provided in the vertebra 40. Additionally, the second stopper 55 is accommodated in the coupling notch 22 that is provided in the wiper lip 20. Additionally, the second stopper 55 is coupled to the other end of the vertebra 40. As shown in FIG. 9, the end cap 51, coupled to the other end of the vertebra 40, does not include the second stopper 55, but includes the first stopper 52 and the auxiliary stopper 53. Accordingly, the end cap 51, coupled to the other end of the vertebra 40, does not directly couple to the wiper lip 20. After assembly of the end cap 51 is completed, the connector apparatus 70 is coupled to a center of the vertebra 40. Additionally, the wiper apparatus 10 is assembled on a wiper arm (not illustrated) via the connector apparatus 70. As such, in a process of assembling the wiper apparatus 10, the first stopper 52 and the second stopper 55 which are provided in the end cap 50, respectively fix the vertebra 40 and the wiper lip 20. Thus, at least one of the end caps 50 and 51 directly fixes the vertebra 40 and the wiper lip 20 at the same time. Accordingly, the wiper lip 20 may be prevented from slipping on the vertebra 4.

A process of detaching the wiper lip 20 from the assembled wiper apparatus 10 is as follows: If the wiper apparatus 10 is installed on a vehicle and used for a long time, the wiper lip 20 may be worn out and needs to be replaced. When the wiper lip 20 is replaced, the wiper lip 20, which is assembled in the wiper apparatus 10, needs to be detached from the wiper apparatus 10. To detach the wiper lip 20 from the wiper apparatus 10, the work cover 60 that is installed on the end cap 51 is lifted upward by rotation. Referring to FIG. 8, a state in which the work cover 60 is opened may be easily understood. In this state, the wiper lip 20 is pulled toward the other end of the vertebra 40. The wiper lip 20 is fixed by the second stopper 55 of the end cap 50 that couples to the end of the vertebra 40. Accordingly, an external force is applied to the wiper lip 20 to a degree to overcome a fixing force of the second stopper 55, so that the wiper lip 20 goes over the second stopper 55. Then, the wiper lip 20 is pulled out and detached from the spoiler-integrated lever 30. Then, a new wiper lip 20 is coupled to the spoiler-integrated lever 30 through a space of the opened work cover 60. After the new wiper lip 20 is coupled to the spoiler-integrated lever 30, the new wiper lip 20 is fixed to the second stopper 55 at the end of the vertebra 40. Additionally, the work cover 60 of the end cap 50, which is coupled to the other end of the vertebra 40, is rotated to be closed. Through this process, the wiper lip 20 of the wiper apparatus 10 may be replaced.

As described above, according to the one or more of the above embodiments of the present invention, a wiper apparatus includes an improved end cap structure in which a wiper lip and a vertebra may be fixed at the same time. Accordingly, the wiper lip may be prevented from slipping on the vertebra, and thus, a durability of the wiper apparatus may be improved. Additionally, since the end cap is assembled in a process of assembling the wiper apparatus, the vertebra and the wiper lip may be fixed at the same time. Thus, assembly may be simple and easy. If the wiper lip is worn out or damaged, and thus, is to be replaced, the wiper lip may be detached from and assembled in the wiper apparatus, without having to detach the end cap from the wiper apparatus. Therefore, serviceability may be remarkably enhanced.

According to an embodiment of the present invention, the work cover is included in the wiper apparatus. However, even when the work cover is not included, a wiper lip may be replaced when one of two end caps is detached from the wiper apparatus.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:
1. A flat-blade wiper apparatus having an improved end cap structure, the flat-blade type wiper apparatus comprising:
a wiper lip that is manufactured of an elastic material, so as to remove foreign substances on a surface of a windshield of a vehicle by contacting and sliding on the windshield;

a spoiler-integrated lever that accommodates an upper part of the wiper lip and prevents the wiper lip from floating on a glass surface of the windshield while the vehicle is moving at a high speed;

a vertebra that is assembled in the spoiler-integrated lever and elastically supports the wiper lip on the windshield; and an end cap that couples to one end of the vertebra and prevents the wiper lip from slipping in a direction of a length of the vertebra, wherein a cap fixing hole is disposed at one end of the vertebra in the direction of the length of the vertebra and passes through an upper surface and a lower surface of the vertebra;

a first stopper protrudes from a ceiling surface of the end cap in a downward direction and couples to the cap fixing hole;

a second stopper protrudes from a sidewall of the end cap toward the wiper lip, and prevents the wiper lip from slipping by being accommodated in a coupling groove that is formed in the wiper lip; and an auxiliary stopper that is disposed in a periphery of the first stopper in the direction of the length of the vertebra from the first stopper to a center of the vertebra, and that is smaller than the first stopper.

2. The flat-blade wiper apparatus of claim 1, wherein the first stopper is formed so that a cross-section thereof is formed in a form of a sawtooth, and a slope at an end in the direction of the length of the vertebra is steeper than a slope at the center of the vertebra.

3. The flat-blade wiper apparatus of claim 1, wherein the second stopper is formed so that a cross-section thereof is formed in a form of a sawtooth, and a slope at an end in a direction of a length of the wiper lip is steeper than a slope at a center of the wiper lip.

4. The flat-blade wiper apparatus of claim 1, wherein two end caps are provided, wherein one end cap is arranged on one end of the vertebra, and the other cap is arranged on the other end of the vertebra, and the end cap, disposed at the other end of the vertebra, does not comprise the second stopper.

5. The flat-blade wiper apparatus of claim 4, wherein the end cap, disposed at the other end of the vertebra, comprises a work cover that may be opened and closed so that the wiper lip may be disassembled or assembled while the end cap, disposed at the other end of the vertebra, is not detached from the vertebra.

6. The flat-blade wiper apparatus of claim 5, wherein the work cover is rotatably coupled to the end cap disposed at the other end of the vertebra.

* * * * *